United States Patent

Chicurel

[15] 3,655,005
[45] Apr. 11, 1972

[54] SPHERICAL DRIVE VEHICLE

[72] Inventor: Enrique J. Chicurel, Av. Mexico 27-4, Col. Hipodromo, Mexico City 11, Mexico

[22] Filed: Sept. 26, 1969

[21] Appl. No.: 861,427

[52] U.S. Cl. .............................................. 180/7 R, 180/26
[51] Int. Cl. .................................... B62d 57/00, B62d 61/06
[58] Field of Search ................................. 180/7, 25–27

[56] References Cited

UNITED STATES PATENTS

| | | | |
|---|---|---|---|
| 3,001,601 | 9/1961 | Aghnides | 180/75 |
| 3,212,594 | 10/1965 | Scott | 180/7 |
| 3,364,874 | 1/1968 | Toennesen | 180/7 X |

FOREIGN PATENTS OR APPLICATIONS

| | | | |
|---|---|---|---|
| 514,711 | 11/1920 | France | 180/7 |

*Primary Examiner*—Leo Friaglia
*Attorney*—David Rabin

[57] ABSTRACT

A multi-wheel vehicle is provided with a single control lever for changing the speed and direction and movement of the vehicle. The lever controls the angular relationship of a hemispherical drive wheel with respect to the vehicle support surface for steering and providing an infinite number of stepless forward and reverse speeds.

10 Claims, 10 Drawing Figures

PATENTED APR 11 1972

INVENTOR.
ENRIQUE CHICUREL

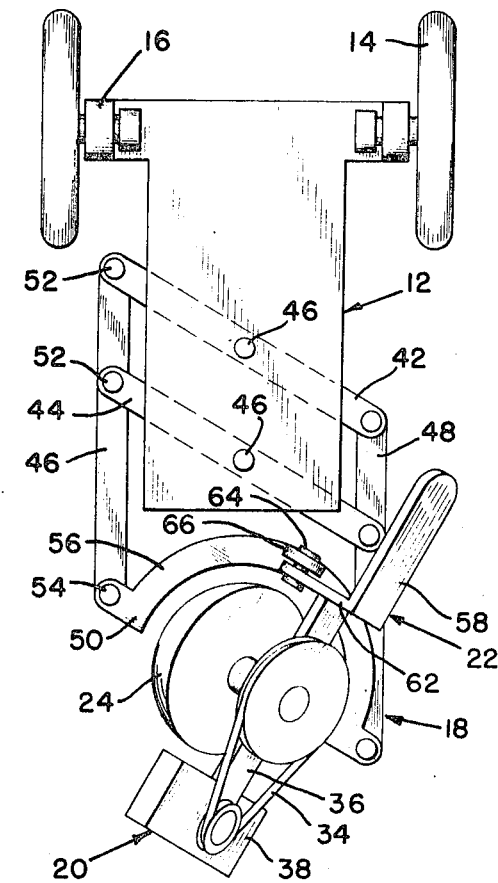
FIG.4
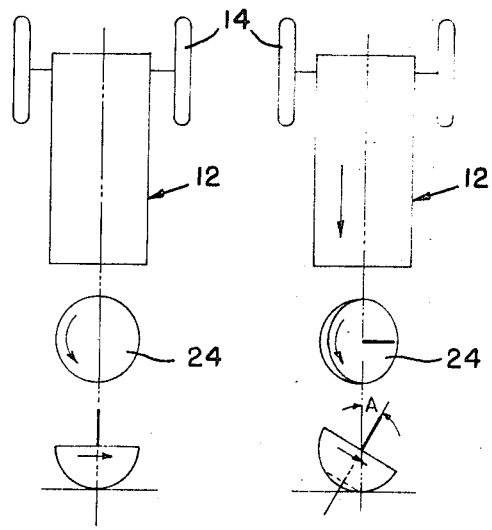
FIG.5a    FIG.5b
FIG.5c    FIG.5d
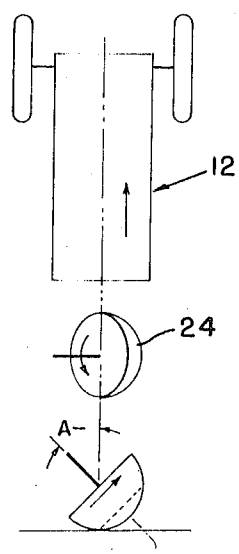
FIG.5e
INVENTOR.
ENRIQUE CHICUREL

SPHERICAL DRIVE VEHICLE

BRIEF SUMMARY AND OBJECTS OF THE INVENTION

This invention relates to a vehicle of novel construction and more particularly to a drive assembly for propelling and steering the vehicle.

Essentially the novel drive assembly consists of an extremely simple positive drive unit with a stepless speed shift having an infinite number of forward and reverse speeds. The vehicle speed shift and steering mechanisms are combined to a single unit and controlled by a single lever. The positive drive unit consists of a motor driven rolling hemisphere, supporting a portion of the vehicle chassis, whose speed and direction of motion depend upon the position of this axis of rotation. The control lever is coupled with the hemispherical wheel so as to roll the wheel to either side in an unconventional manner to control vehicle speed from zero to substantially high speeds in either forward or reverse directions. The lever also controls the direction of travel of the vehicle by varying the angular relationship of the hemispherical wheel with respect to the vehicle.

One of the primary objects of the invention is a vehicle having novel speed shift and steering mechanisms directly controlled by a single lever.

Another object of the invention is an extremely simple, stepless, vehicle speed shift and drive arrangement which eliminates clutch, gear box, differential, and automatic shift mechanisms, having an infinite number of forward and reverse speeds and permits a great traction force at low speed.

A further object of the invention is a novel vehicle having excellent maneuverability and extremely smooth speed shift.

Another object of the invention is a vehicle drive wheel that may be rolled to either side to vary the vehicle speed in both forward and reverse directions of travel.

BRIEF DESCRIPTION OF THE FIGURE

FIG. 4 is a schematic top plan view of the vehicle, similar to FIG. 1, but illustrating the drive components in a forward, right turn position;

FIGS. 5a–5e schematically illustrate top plan views of the vehicle and front elevational views of the hemispherical drive wheel in a number of variable positions of the drive wheel.

DETAILED DESCRIPTION OF THE INVENTION

Figure 1:
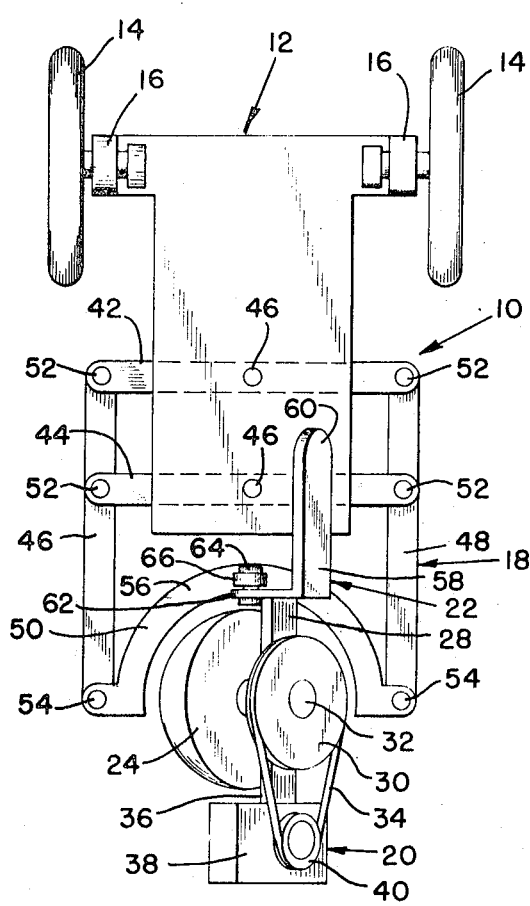
FIG. 1 is a schematic, top plan view of the novel vehicle with the drive components in a straight forward, medium speed position.
Figure 2:
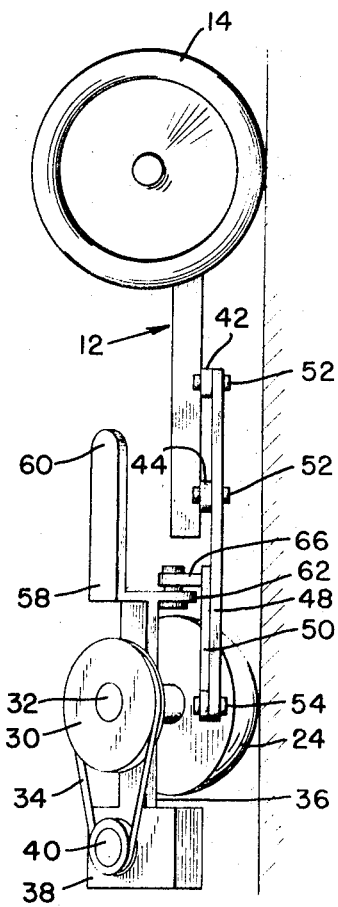
FIG. 2 is a front elevational view of the vehicle of FIG. 1.
Figure 3:
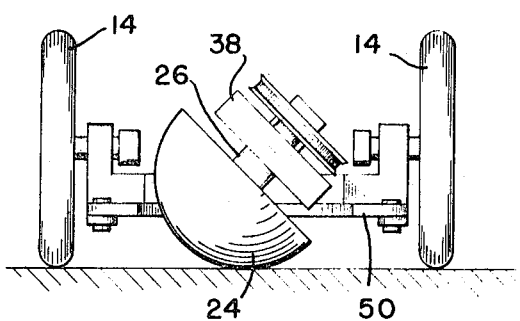
FIG. 3 is a front elevational view of the vehicle of FIG. 1.

Referring first to FIGS. 1–3 of the drawing, there is shown a vehicle 10 embodying the features of the invention. The vehicle 10 comprises a chassis 12 provided with a pair of rearwardly mounted wheels 14 rotatably supported by bearings 16. A drive control assembly 18 is pivotably mounted on the forward portion of the chassis 12. The drive control assembly 18 comprises a drive unit 20 and a shift-steering mechanism 22.

The drive unit 20 includes the hemispherical wheel 24 secured to a drive shaft 26 having an intermediate portion rotatably mounted in bearings, not shown, supported by frame member 28. A driven pulley 30 is secured to one end portion 32 of shaft 26 and driven through a flexible drive element 34. Fixedly secured to the forward end portion 36 of frame member 28 is a conventional motor unit 38 for driving the flexible element 34 through a pulley 40, the diameter of pulley 30 being substantially greater than that of pulley 40.

The shift-steering mechanism 22 is composed of a pantograph-like frame formed by members 42–50 pivotably mounted upon studs 46 positioned intermediate the length of chassis 12. Members 42, 44 and members 46, 48, respectively, are positioned in spaced parallel relation and pivotably secured to each other about studs 52 adjacent the ends thereof. The member 50, pivotably secured at the studs 54 to extended end portions of members 46, 48, has an arcuate portion 56 formed therein for receiving a portion of the hemispherical wheel 24. An L-shaped control lever 58, having one leg 60 extending in spaced parallel relation to frame member 28 and having the other leg 62 secured to and extending perpendicular from the frame member 28, is attached to the intermediate portion of arcuate member 56 by means of a pin 64 located within an opening provided in upstanding flange 66 secured to portion 56. Angular movement of control lever 58 about pin 64 changes the angular position of the hemisphere 24, as can be observed from FIG. 5a and FIG. 5e.

The speed and direction of motion of the vehicle essentially depends upon the position of the axis of rotation of the rolling hemisphere 24. FIGS. 5a–5e schematically show the basic elements of the vehicle, with the upper portions of each figure showing the rolling hemisphere, chassis and rear wheels of the vehicle, and the lower portion of each figure showing the hemispherical wheel 24 only. For the sake of clarity, no structural connection has been shown between the hemisphere 24 and the chassis 12 in the upper portions of the figures, and the chassis and rear wheels have not been shown in the lower portions of the figures. Since the peripheral speed of the hemispherical wheel is zero at the pole and increases toward the equator, the speed of the vehicle depends upon the angular distance of the point of rolling contact of the wheel upon a support surface from the pole of the hemispherical wheel, that is the angle A, which the axis of rotation makes with the vertical. While the speed of the motor unit may be varied, for purposes of explanation, it is to be assumed that the hemispherical wheel 24 is driven counterclockwise at a constant angular velocity.

Referring particularly to FIGS. 5a–5e, and assuming that the wheel 24 is driven at a constant angular velocity, it can be seen that the velocity of the vehicle can be varied by changing the angular relationship of the hemispherical wheel 24 with respect to the wheel support surface. FIG. 5a represents a neutral or stopped position where no motion is imparted to the vehicle 10 since the angle A, the axis of rotation of the wheel 24 with respect to the vertical, is zero. FIG. 5b represents a position of low speed of the vehicle. In FIG. 5c it can be observed that the angle A has increased substantially pivoting the wheel 24 to a position of high speed. In FIG. 5e the angle A is negative to that shown in FIGS. 5b and 5c and results in reverse motion of the wheel 24 and vehicle 10. As can be observed from FIGS. 5a, 5b, 5c and 5e, the effective rolling diameter of the hemispherical wheel 24, as shown in dotted lines, clearly increases with an increase of the angle A.

In order to fully understand the steering of the vehicle, steering is defined as a line passing through the center of the hemisphere and perpendicular to the plane containing the point of contact in the axis or rotation of the hemisphere. As can be observed from FIG. 5d, the angle B, which the line of steering makes with the longitudinal axis, determines the direction of motion of the vehicle. The angle B is the complement of the angle between the axis of rotation and the longitudinal axis. Thus, it can be seen that both the speed shift angle A and the steering angle B depend upon the position of the axis of rotation of the hemisphere 24.

Operation of the pantograph-like steering mechanism 22 will be readily understood by referring to FIGS. 1 and 4. In FIG. 1 the steering mechanism and wheel 24 are in a forward, straight ahead condition, while FIG. 4 illustrates the wheel and steering mechanism in a forward-right turn position. Notice that in FIG. 4, the control lever 58 has been moved to the left, from the point of view of the vehicle driver, thus changing the angular position of the line of steering relative to the chassis, similar to that shown by the angle B in FIG. 5d. Note that the pivot shaft 64 has moved in an arc concentric with the hemispherical wheel carrying with it the arcuate member 50 of the steering mechanism upon which the pivot shaft 64 is mounted, thus deflecting the entire pantograph-like frame.

It is to be noted that the shaft-steering mechanism 22 keeps the center of the hemisphere fixed in relation to the chassis 12, independently of the various shift and steering positions. The purpose is to maintain the chassis 12 level in the hemisphere's point of contact with the support surface in the same position relative to the chassis, the point of contact always being directly below the center of the hemisphere. In other words, the chassis 12 is always supported at the same three fixed points, that is the points of contact of the three wheels.

A slight turning effect may result while shifting the wheel 24, for example, between the positions of FIG. 5a and FIG. 5e, however, this effect is minimized by the large ratio of the rear wheels-to-sphere distance to sphere diameter and, furthermore, can be easily compensated by simultaneously slightly counter-steering the vehicle since all speed control and steering is accomplished with one hand through displacement of the control lever 58.

Figure 6:
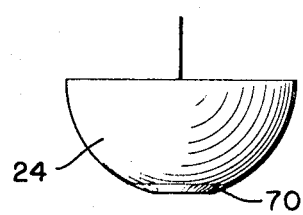
FIG. 6 is a front elevational view of a hemispherical drive wheel having a brake shoe positioned at the pole of the hemisphere.

FIG. 6 relates to a modified hemispherical drive wheel 24 having the bottom or pole portion provided with a floating, slightly flattened brake shoe or pad 70. By incorporating the brake shoe 70 on wheel 24, separate vehicle braking mechanisms may be eliminated. Since the center of the brake shoe is mounted freely about the axis of wheel rotation, braking would result automatically in the neutral position when angle A is 0° as shown by FIG. 5a. Therefore, braking could also be effected by the single control lever 58.

It should be pointed out that various types of shift-steering mechanisms, other than the pantograph-like arrangement, could be utilized. Also, a gear drive or sprocket and chain drive could be substituted for the pulleys 30, 40 and flexible element 34 which would result in a positive drive for the hemispherical wheel 24.

I claim:

1. A vehicle comprising a chassis, a load supporting wheel disposed adjacent each side of said chassis, a tiltable and steerable hemispherical wheel secured to said chassis in spaced relation to said load supporting wheels, means for supplying traction torque to said hemispherical wheel and drive control means coupled to said hemispherical wheel for both controlling the direction of movement of said vehicle by varying the angular relationship of said hemispherical wheel and for varying the vehicle speed in forward and reverse directions by tilting the hemispherical wheel relative to said chassis.

2. A vehicle as defined in claim 1, said hemispherical wheel being pivotable about an axis to vary the speed thereof by changing the effective rolling diameter.

3. A vehicle as defined in claim 1, said drive control means including a single control element for controlling both, the direction of vehicle travel and the speed of said vehicle.

4. A vehicle as defined in claim, 3, said control element including means for varying the orientation of the axis of rotation of said hemispherical wheel to control the speed and direction of motion of said vehicle.

5. A vehicle as defined in claim 4, said hemispherical wheel being adapted to be rolled to either side of the pole of the hemisphere to drive the vehicle in a forward or rearward direction and to vary the vehicle speed in either direction of travel.

6. A vehicle as defined in claim 5, further comprising a brake shoe freely supported at the pole of said hemispherical shaped wheel for effecting braking of said vehicle by actuation of said control element.

7. A vehicle as defined in claim 1, said drive control means comprising a drive unit for rotating said hemispherical wheel and a shift-steering mechanism for controlling said hemispherical wheel.

8. A vehicle as defined in claim 7, said drive unit and said shift-steering mechanism being pivotably secured to said chassis as a unit.

9. A vehicle as defined in claim 1, said hemispherical wheel including a floating shoe positioned at the pole portion thereof.

10. A vehicle comprising a chassis, a freely rotatable wheel provided at each side of the chassis, a single tiltable and steerable hemispherical wheel secured to the chassis in spaced relation to the freely rotatably wheel, and means mounting said hemispherical wheel on said chassis to allow unimpeded sideways rolling of the hemispherical wheel, whereby the axis of said freely rotatable wheels and the horizontal projection of the axis of said hemispherical wheel intersects when turning at a point in a plane spaced from said vehicle.

* * * * *